Patented Aug. 7, 1934

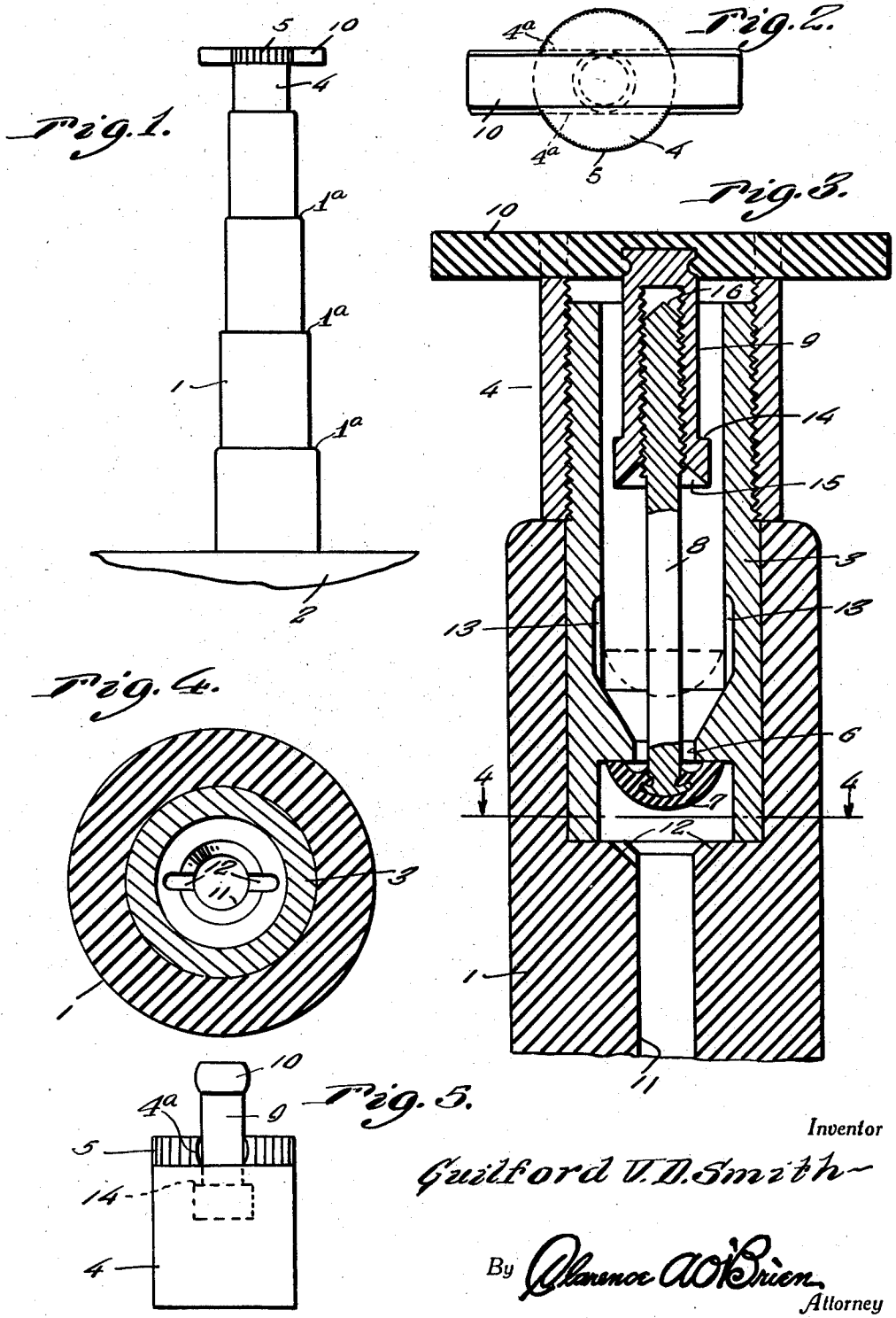

1,968,965

UNITED STATES PATENT OFFICE 1,968,965

TIRE VALVE

Guilford Van Dyke Smith, Fayetteville, Ark.

Application April 26, 1933, Serial No. 668,127

7 Claims. (Cl. 152—12)

This invention relates to improvements in valves for a pneumatic vehicle tire and pertains particularly to a valve stem and related parts which will not injure a casing or tube if drawn through a wheel, rim or felly into the interior of a casing.

One of the features of the invention relates to a valve which may be drawn into a tire casing if deflation occurs from any cause while the vehicle is in motion.

One of the purposes of this invention is the provision of a mechanism which will serve positively to release air from a tire when the latter is subjected to critical strains. To accomplish this, the air is released through the stem as the stem is pulled through the wheel rim or felly and before disastrous deflation can occur.

Another feature involves the provision of a tire valve of the character described embodying a novel construction, combination and arrangement of parts through the medium of which the inner tube will be completely deflated should the tire creep and the valve be drawn through the opening provided therefor in the vehicle wheel into the tire casing.

Still a further feature relates to the construction and exterior shape of the valve stem which, when initially started in its withdrawal through a rim, will be retarded in any possible tendency to work back through the rim hole. The fact will be recognized that the return movement is not in itself injurious but the damage may be sustained by separation of the valve stem from the tube, which latter has been a recognized factor in the use of metal valve stems which are now rendered unnecessary by this invention.

Other objects of the invention are to provide a tire valve of the character set forth which will be simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation, showing a valve constructed in accordance with the present invention.

Figure 2 is a view in top plan of the cap showing the cross head seated therein.

Figure 3 is a vertical sectional view on an enlarged scale through the upper portion of the valve.

Figure 4 is a view in horizontal section, taken substantially on the line 4—4 of Figure 3.

Figure 5 is a detail view in elevation of the cap, showing the cross head raised as when the valve is opened to deflate the inner tube.

Referring now to the drawing in detail, it will be seen that the embodiment of the invention which has been illustrated comprises a flexible stepped stem 1 of any suitable material, preferably rubber, which is secured to the inner tube 2 in any suitable manner. Mounted in the outer portion of the flexible stem 1 is a metallic sleeve 3 which projects beyond the free end of said stem, the projecting portion of the sleeve 3 being externally threaded to retain a removable cup shaped cap 4 the wall of which extends downwardly. The top portion of the cap 4 substantially closes the bore of the sleeve 3 and at its upper outer edge is knurled, as at 5. The cap 4 is slotted diametrically at 4ª to receive a cross head 10, as will be described.

Formed in the lower portion of the metallic sleeve 3 is a seat 6 with which a flexible valve 7 of suitable material, preferably rubber, is operatively engageable. The valve 7 is adapted to be pulled through the seat 6 to the position indicated in broken lines in Figure 3 of the drawing and to this end is mounted on a threaded stem 8. The stem 8 is threadedly engaged in a socket member 9 which is mounted on a flexible cross head 10 which seats in said transverse groove or channel 4a provided therefor in the top of the cap 4 when the valve is closed. Although flexible, the crosshead 10 is sufficiently rigid to pull the valve 7 through the seat 6.

The rim of the opening where the bore 11 of the flexible stem 1 merges with the space containing the valve 7 is not exactly annular but is provided with grooves 12 to prevent seating thereagainst of the valve 7 when the inner tube is being inflated. Adjacent the seat 6, the bore of the sleeve 3 has formed therein grooves 13 for the passage of air around the valve 7 when said valve 7 has been pulled through the seat 6 to the position shown in broken lines in Figure 3 of the drawing.

Should the tire creep and deflation of the inner tube occur when the vehicle is in motion, the flexibility of the stem 1 permits the valve constituting the present invention to be drawn into the tire casing without damage either to said valve or to the inner tube. When this occurs the under surfaces of the crosshead 10 adjacent the ends thereof engages the wheel and the valve 7 is pulled through the seat 6 from the position shown in full lines in Figure 3 of the drawing substantially to the position shown in broken lines in said Figure 3, thus assuring complete deflation of the inner tube. The socket member 9 has formed thereon a shoulder 14 which engages the inner surface top of the cap 4 in a manner to prevent complete detachment of the crosshead 10, said socket member 9, the valve stem 8 and the flexible valve 7. The opening or slot in the top of the cap 4 which accommodates the socket member 9 is too small to permit the passage of the enlargement on said socket member which forms the shoulder 14. After the flexible valve 7 has been pulled through its seat 6 and when the shoulder 14 engages the top of the cap 4, the crosshead 10 flexes by engagement with the wheel sufficiently to permit said crosshead to pass through the valve stem opening in the wheel. It will be obvious that creeping of the tire or tube will pull the stem 8 and cause complete deflation before continued creeping could draw the stem completely through the rim or felly and into the casing.

To inflate the inner tube 2, the cap 4 is, of course, unthreaded from the metallic sleeve 3 and the socket member 9 is unthreaded from the stem 8. As will be apparent, the valve stem 8 may be threadedly adjusted as desired in the socket member 9. At its lower end, the socket member 9 is internally tapered, as at 15, to facilitate the insertion or introduction of the stem 8, the upper end of said stem 8 being also tapered, as at 16, for this purpose. The threads on the stem 8 and in the socket member 9 may be coarser than those on the sleeve 3 and the cap 4 to facilitate adjustment of the flexible valve 7 relative to its seat 6, if necessary or desirable, when screwing said cap in position.

The flexible stem 1 has a particular exterior shape having steps 1a as a result of which the stem is of progressively reduced diameter from its base to its outer end. These steps serve as detents to engage the walls of a hole in a wheel, rim or felly to prevent the stem from slipping or being forced back through the valve stem hole after it has once been started in its withdrawal movement. The shape of the stem therefore is a factor toward preventing disadvantageous return of the stem while a tire is in use and travelling. When assembling the stem and its tube or casing on a wheel, no especial difficulty is experienced in inserting the stem into its rim opening.

It is believed that the many advantages of a tire valve constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A tire valve comprising a flexible stem, a seat in the stem, a flexible valve operatively engageable with the seat, and a flexible crosshead mounted on the stem and connected with the flexible valve, said flexible crosshead being engageable with the wheel upon which the tire is mounted for pulling the flexible valve through said seat upon creeping of the tire.

2. A vehicle tire valve comprising a stem, a seat in the stem, a flexible valve operatively engageable with the seat, a cap removably mounted on the stem, and a flexible crosshead mounted on the cap and connected with the flexible valve, said flexible crosshead being engageable with the vehicle wheel for pulling the flexible valve through the seat upon creeping of the tire.

3. A vehicle tire valve comprising a flexible stem, a sleeve mounted longitudinally in the stem and projecting from one end thereof, a removable cap threadedly mounted on the sleeve, a seat in the sleeve, a flexible valve operatively engageable with the seat, and a flexible crosshead shiftably mounted on the cap and connected with the valve, said crosshead being engageable with the vehicle wheel for pulling the flexible valve through the seat upon creeping of the tire.

4. A vehicle tire valve comprising a flexible stem, a metallic sleeve mounted in one end portion of the stem and projecting therefrom, a removable cap threadedly mounted on the sleeve, a seat in the sleeve, a flexible valve operatively engageable with the seat, a stem extending through the seat from the valve, a flexible crosshead engageable with the cap, and a socket member mounted on the crosshead and extending slidably into the cap and threadedly connected with the second named stem, said crosshead constituting means for pulling the flexible valve through the seat upon creeping of the tire.

5. A vehicle tire valve comprising a flexible stem, a metallic sleeve mounted in one end portion of the stem and projecting therefrom, a removable cap threadedly mounted on the sleeve, a seat in the sleeve, a flexible valve operatively engageable with the seat, a stem extending through the seat from the valve, a flexible crosshead engageable with the cap, and a socket member mounted on the crosshead and extending slidably into the cap and threadedly connected with the second named stem, said crosshead constituting means for pulling the flexible valve through the seat upon creeping of the tire, the threads of the cap and sleeve being of different pitch than the threads of the socket member and stem.

6. In a tire valve, a stem adapted to extend from a tube through a stem opening in a felly or rim, a valve within said stem and so constructed and arranged with respect to its seat that pronounced outward pull on the valve pin will open the valve, and a cross head connected to said valve and normally extending across the valve opening in the stem and beyond the sides of the stem, and of flexible material whereby if the stem be drawn through the stem opening it will at first engage the axial side of the felly or rim thus opening the valve and upon continued movement through the opening be yieldably drawn with the stem through the stem opening.

7. In a tire valve, a stem adapted to extend from a tire through a felly or rim, a valve within said stem with a head having a laterally extending portion of flexible material adapted to constitute an air tight seal against a seat within said stem and which seat is relatively rigid as compared to said valve head, said laterally extending portion being deformable to permit withdrawal of the head through the valve seat opening, and a cross head connected with the valve and extending across the valve opening in the stem and beyond the sides of the stem whereby if the stem be drawn through the stem opening the cross head will engage the axial side of the felly or rim thus opening the valve by pulling the head thereof through the valve seat opening.

GUILFORD V. SMITH.